Aug. 23, 1932.  J. L. DRAKE  1,872,695

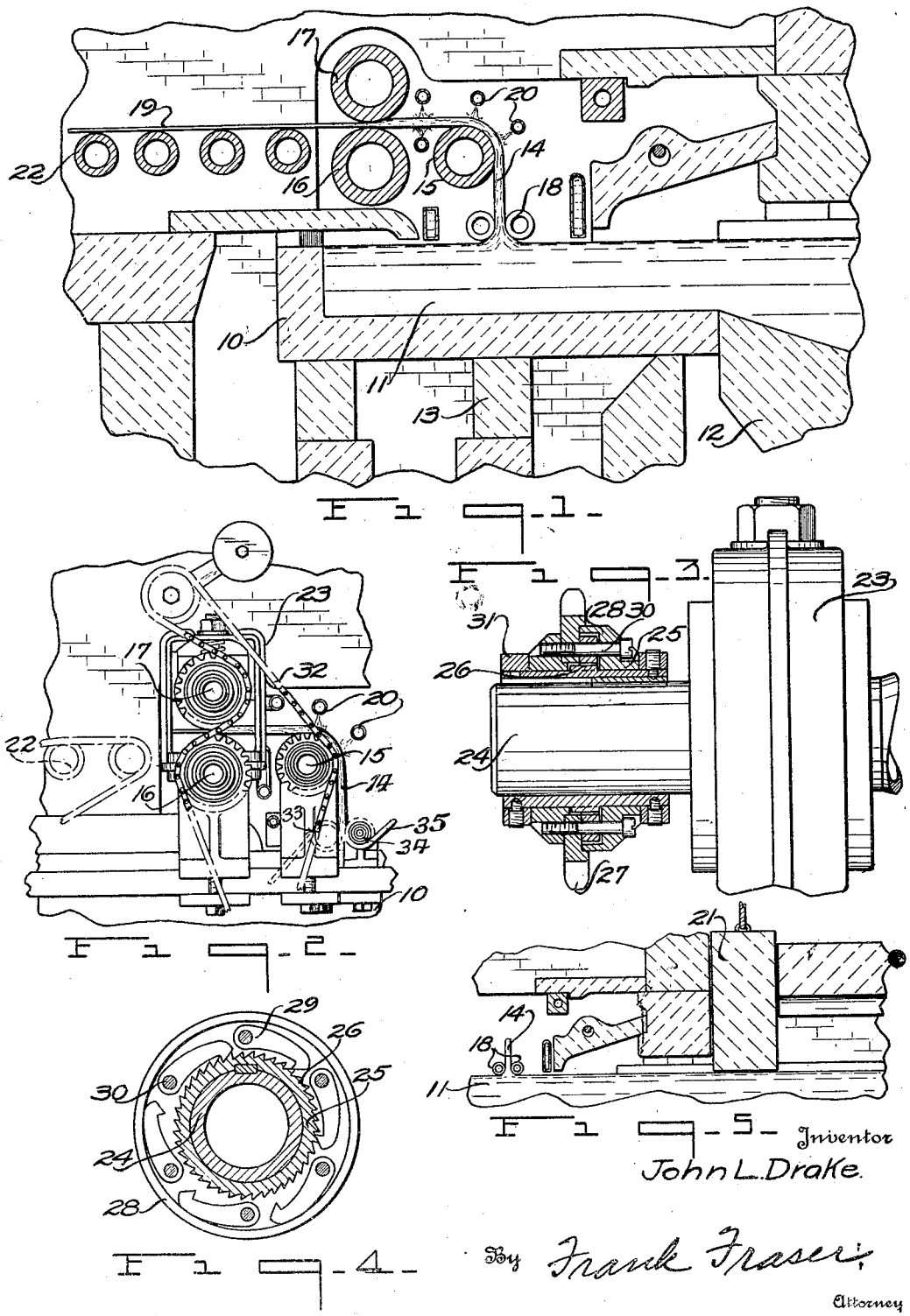

PROCESS AND APPARATUS FOR PRODUCING SHEET GLASS

Original Filed Sept. 10, 1927   2 Sheets-Sheet 2

Inventor
John L. Drake.

By
Frank Fraser,
Attorney

Patented Aug. 23, 1932

1,872,695

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed September 10, 1927, Serial No. 218,645. Renewed December 31, 1931.

The present invention relates to a process and an apparatus for producing sheet glass.

An important object of the invention is to provide a process and an apparatus for producing sheet glass wherein a relatively heavy mass of molten glass is drawn upwardly and then deflected into substantially a horizontal plane, after which the said mass of glass is rolled and reduced in thickness to form a flat and predetermined sheet of glass.

Another object of the invention is to provide in sheet glass apparatus, a mass of molten glass, means for moving a relatively heavy mass of glass vertically and deflecting the same into a horizontal plane, and then passing the heavy mass of glass through a pass created between sheet forming rolls which are preferably positively driven and arranged to form a sheet of predetermined thickness.

Another object of the invention is to provide an apparatus of this nature wherein a pair of rolls are arranged close to a mass of molten glass adapted to assist in building an upwardly moving body of glass which is preferably deflected into a horizontal plane, while being heat treated, the said mass of glass then being passed between sheet forming rolls which reduce the same to a flat uniform sheet of predetermined thickness.

A further object of the invention is to provide in sheet glass apparatus, a plurality of rolls adapted to convey and roll glass into a sheet of predetermined thickness, some of the rolls being positively driven but having means associated therewith whereby the rolls may be rotated at a faster rate of speed than that at which it is normally positively driven.

A further object of the invention is to provide in sheet glass forming means, a plurality of normally positively driven rolls arranged to create a sheet forming pass and having overrunning clutches associated therewith whereby the rolls may be normally positively driven but also permitting the sheet to rotate the rolls when the speed of the sheet exceeds the speed of the rolls as driven by said positive driving means.

Other objects and advantages of the invention will become more apparent during the course of the following description when taken in connection with the accompanying drawings.

Figure 6:
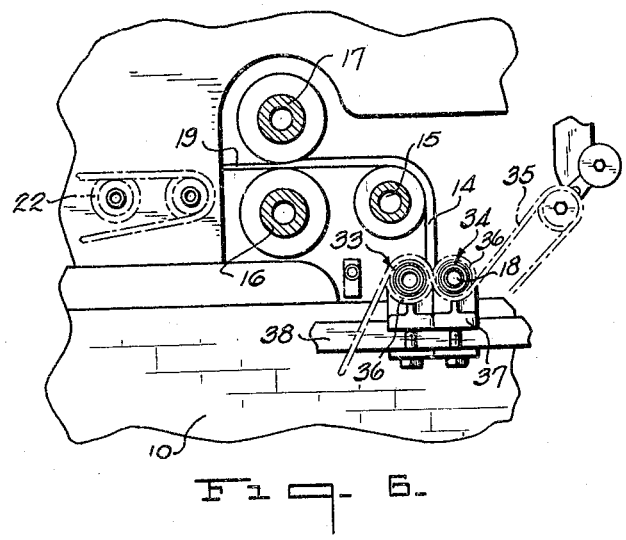
Figure 7:
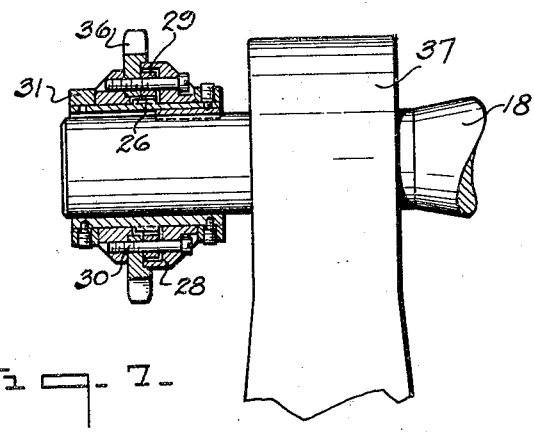

In the drawings wherein like numerals are employed to designate like parts throughout the same, Fig. 1 is a vertical longitudinal section through a form of machine on which the invention may be applied, Fig. 2 is a fragmentary elevation illustrating the invention in use, Fig. 3 is a fragmentary sectional view showing in detail a clutch, Fig. 4 is another sectional detail of the clutch, Fig. 5 is a fragmentary vertical longitudinal section illustrating another portion of the machine, Fig. 6 is a vertical longitudinal section through a portion of the machine showing the overrunning clutches associated with the feed rolls, and Fig. 7 is a detail section of one of the overrunning clutches for the feed rolls, taken at substantially right angles to Fig. 6.

This invention relates to the type of machine disclosed in the copending application of Drake and Mambourg, Serial No. 214,278, filed August 20, 1927.

The numeral 10 designates a working receptacle or draw-pot adapted to contain a mass of molten glass which may be continuously supplied from any desired form of melting tank 12. The working receptacle 10 is preferably supported on spaced stools 13 arranged in a suitably heated compartment whereby to maintain the molten glass 11 at the proper temperature. The invention contemplates the formation of a relatively heavy mass of molten glass, which mass is moved vertically and then deflected into a horizontal plane, after which it is rolled into a sheet of predetermined thickness. To this end the molten glass 11 is moved upwardly to create a relatively heavy mass 14 which is then deflected over a preferably positively driven roll 15 so that the mass will be advanced in a horizontal plane to a sheet forming pass created between a pair of preferably positively driven rolls 16 and 17. To assist in building up the mass 14, feed rolls 18 may be used, and together with the operation of the rolls and the proper viscosity of the glass 11, a sufficiently heavy mass of molten glass 14 will be furnished to the sheet forming pass to allow the production of a sheet 19 having a predetermined thickness.

To permit the mass of molten glass 14 to be deflected into a horizontal plane and to maintain the glass at a viscosity such that the glass may be rolled into a sheet, heating means 20 may be used. Any arrangement of heating means may be provided, and as shown, the mass 14 is heated on both sides to further assist in building the desired thickness of mass 14 as shown in Fig. 5. An adjustable jack arch or curtain wall 21 may be used, which wall is preferably so adjusted that the heat and gases above the molten glass in the melting end of the furnace will be separated from the heat and gases above the glass in the working receptacle 10, thus allowing the molten glass to attain the proper viscosity to permit its upward withdrawal from the receptacle in the form of a relatively heavy mass or sheet source. It is desirable that the mass 14 be of considerable thickness so that sufficient glass will be supplied to the sheet forming pass to permit an actual rolling thereof into a relatively thinner sheet.

Normally, it is desired that the rolls 15, 16, 17 and 18 be positively driven, but there are times when it is desirable to allow the rolls to move faster than the speed at which they are normally positively driven. In such cases the moving glass causes the rolls to be rotated, and therefore the rolls can be rotated at different speeds by said sheet, thus preventing buckling or warping of the glass.

In accordance with the present invention, therefore, it is possible to positively drive the rolls while at the same time provision is made to allow the rolls to idle and be moved by the sheet during the time that the sheet has a tendency to move faster than the rolls. In other words, the leer rolls or other conveying rolls 22 exert a sufficient tractive force on the sheet 19 to draw the glass from the receptacle and over the rolls as above explained. Normally, the rolls 15, 16, 17 and 18 positively advance the glass, but they are all so mounted that any one or all of said rolls may be driven by said glass, or in other words, the rolls may overrun the driving means. The construction I provide is such that as soon as the speed of the sheet exceeds the speed of the rolls, the rolls will be permitted to idle, and as soon as the speed of the sheet becomes slower than the speed of the rolls, the sheet will immediately begin to be positively driven by the rolls so that the desired thickness of sheet will always be produced.

To accomplish this result, an overrunning clutch is associated with each of the rolls, and as shown in Figs. 2, 3 and 4, each of the rolls 15, 16 and 17 is journaled in a suitable bearing 23 while each shaft extends therebeyond leaving an extension 24. Keyed to the shaft 24 and adapted to rotate therewith is a sleeve 25 carrying a ratchet 26 shown in Figs. 3 and 4. A drive pinion 27 is carried by a rotatable annular member 28 free to rotate on the member 25 as shown in Fig. 3. Pawls 29 are pivotally associated with the sprocket 27 by means of a bearing pin 30. A suitable retaining ring 31 is provided to prevent accidental displacement of the parts of the clutch. Normally, the sprocket 27 is driven by means of a sprocket chain 32 trained over the various sprockets, and it will be seen that in Fig. 4 the roll is being rotated in the direction of the arrow. The pawls 29 engage the ratchet 26 when the sprocket is being positively driven, thereby causing a positive rotation of the roll carrying the clutch. However, as soon as the sheet speed exceeds the roll speed, it will be seen that the roll may be moved faster than the driving means drives it as the ratchet can move past the pawls without any trouble, thus allowing the rolls to be driven by the moving glass. The overrunning clutches for the two feed rolls 18 are illustrated in Figs. 2, 6 and 7 and are designated in their entirety by the numerals 33 and 34 respectively. These overrunning clutches are preferably of the same construction as the clutches described hereinabove for the rolls 15, 16 and 17, the overrunning clutches for the feed rolls being driven by a sprocket chain 35 trained about sprockets 36 which correspond to the sprockets 27 above described. The feed rolls 18 are preferably relatively shorter than the rolls 15 to 17 and are journaled in bearings 37 mounted upon a supporting member 38, the bearings 37 being positioned inwardly of the bearings 23 for the rolls 15, 16 and 17. The overrunning clutches for the feed rolls operate in the same manner as the overrunning clutches of the rolls 15, 16 and 17. That is to say, the sprocket chain 35 serves to positively drive the rolls 18 at a predetermined speed. However, as soon as the speed of the sheet exceeds the speed of the rolls, the rolls will be moved at a faster speed than that at which they are normally positively driven.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a receptacle containing a mass of molten glass, a roll arranged thereabove over which a mass of molten glass, drawn from said receptacle, is deflected, a pair of rolls arranged to create a sheet forming pass through which the mass passes, after it has been deflected, to be reduced into a sheet of predetermined thickness, said rolls being positively driven, and means associated with each roll for allowing the glass to rotate the rolls faster than they are positively driven.

2. In sheet glass apparatus, a receptacle containing a mass of molten glass, a roll arranged thereabove over which a mass of molten glass, drawn from said receptacle, is deflected, a pair of rolls arranged to create a sheet forming pass through which the mass passes, after it has been deflected, to be reduced into a sheet of predetermined thickness, means for positively driving said rolls, and an overrunning clutch associated with each roll.

3. In sheet glass apparatus, a receptacle containing a mass of molten glass, a roll arranged thereabove over which a mass of molten glass, drawn from said receptacle, is deflected, a pair of rolls arranged to create a sheet forming pass through which the mass passes, after it has been deflected, to be reduced into a sheet of predetermined thickness, and feed rolls arranged between said first mentioned roll and the surface of the molten glass.

4. In sheet glass apparatus, a receptacle containing a mass of molten glass, a roll arranged thereabove over which a mass of molten glass, drawn from said receptacle, is deflected, a pair of rolls arranged to create a sheet forming pass through which the mass passes, after it has been deflected, to be reduced into a sheet of predetermined thickness, feed rolls arranged between said first mentioned roll and the surface of the molten glass, and means for heating the mass of glass as it is being deflected.

5. In sheet glass apparatus, a receptacle containing a mass of molten glass, a roll arranged thereabove over which a mass of molten glass, drawn from said receptacle, is deflected into a horizontal plane, a pair of rolls arranged in proximity to the first mentioned roll and mounted to create a sheet forming pass through which the mass passes after it has been deflected and is rolled into a sheet of predetermined thickness, said rolls being positively driven, and means associated with each roll for allowing the glass to rotate the rolls faster than they are normally positively driven.

6. In sheet glass apparatus, a receptacle containing a mass of molten glass, a roll arranged thereabove over which a mass of molten glass, drawn from said receptacle, is deflected into a horizontal plane, a pair of rolls arranged in proximity to the first mentioned roll and mounted to create a sheet forming pass through which the mass passes after it has been deflected and is rolled into a sheet of predetermined thickness, means for positively driving said rolls, and an overrunning clutch associated with each roll.

7. In sheet glass apparatus, a receptacle containing a mass of molten glass, a roll arranged thereabove over which a mass of molten glass, drawn from said receptacle, is deflected into a horizontal plane, a pair of rolls arranged in proximity to the first mentioned roll and mounted to create a sheet forming pass through which the mass passes after it has been deflected and is rolled into a sheet of predetermined thickness, and feed rolls arranged between said first mentioned roll and the surface of the molten glass.

8. In sheet glass apparatus, a receptacle containing a mass of molten glass, a roll arranged thereabove over which a mass of molten glass, drawn from said receptacle, is deflected into a horizontal plane, a pair of rolls arranged in proximity to the first mentioned roll and mounted to create a sheet forming pass through which the mass passes after it has been deflected and is rolled into a sheet of predetermined thickness, feed rolls arranged between said first mentioned roll and the surface of the molten glass, and means for heating the mass of glass as it is being deflected.

9. The process of producing sheet glass, consisting in rolling a moving mass of glass into a sheet of substantially predetermined thickness, by normally positively driven members and allowing said members to be driven by the glass, when the speed of the glass exceeds that at which said members are normally positively driven.

10. In sheet glass apparatus, means containing a supply of molten glass, a pair of forming rolls mounted to create a sheet forming pass through which a relatively heavy mass of glass is adapted to be passed from said supply and rolled to a sheet of substantially predetermined thickness, means for positively driving said rolls, and means associated with each roll whereby the glass may be caused to rotate the rolls faster than they are normally positively driven.

11. In sheet glass apparatus, means containing a supply of molten glass, a pair of forming rolls mounted to create a sheet forming pass through which a relatively heavy mass of glass is adapted to be passed from said supply and rolled to a sheet of substantially predetermined thickness, feed rolls arranged between the forming rolls and the supply of molten glass, means for positively driving said forming rolls and feed rolls, and means associated with each feed roll whereby the glass may be caused to rotate the said rolls faster than they are normally positively driven.

12. In sheet glass apparatus, means containing a supply of molten glass, a pair of forming rolls mounted to create a sheet forming pass through which a relatively heavy mass of glass is adapted to be passed from said supply and rolled to a sheet of substantially predetermined thickness, feed rolls arranged between the forming rolls and the supply of molten glass, means for positively driving said forming rolls and feed rolls, and means associated with each of said rolls whereby the glass may be caused to rotate the rolls faster than they are normally positively driven.

Signed at Toledo, in the county of Lucas and State of Ohio, this 7th day of September, 1927.

JOHN L. DRAKE.